United States Patent [19]
Park

[11] Patent Number: 5,751,084
[45] Date of Patent: May 12, 1998

[54] AIR DISCHARGE GUIDING ARRANGEMENT FOR PREVENTING THE SCATTERING OF FOREIGN MATTER OF A SPINDLE MOTOR

[75] Inventor: Il Oung Park, Seoul, Rep. of Korea

[73] Assignee: Samsung Electro-Mechanics Co., Ltd., Rep. of Korea

[21] Appl. No.: 734,300

[22] Filed: Oct. 21, 1996

[30] Foreign Application Priority Data

May 29, 1996 [KR] Rep. of Korea .................. 1996-18434

[51] Int. Cl.[6] .......................... H02K 15/00; H02K 7/14; F16C 33/72
[52] U.S. Cl. ................... 310/90; 310/86; 310/87; 310/88; 277/133; 277/134; 277/DIG. 8; 384/134; 384/478; 360/98.04; 360/98.07; 360/99.08
[58] Field of Search ...................... 310/85, 86, 87, 310/88, 90; 384/478, 134; 277/DIG. 8, 133, 134; 360/98.07, 98.04, 99.08

[56] References Cited

U.S. PATENT DOCUMENTS

| 3,131,940 | 5/1964 | Ertaud | 277/28 |
| 4,471,963 | 9/1984 | Airhart | 277/1 |
| 5,019,733 | 5/1991 | Kano et al. | 310/61 |
| 5,130,585 | 7/1992 | Iwamatsu et al. | 310/59 |
| 5,189,688 | 2/1993 | Ono et al. | 378/133 |
| 5,451,066 | 9/1995 | Totain | 277/134 |

Primary Examiner—Thomas M. Dougherty
Assistant Examiner—Tran N. Nguyen
Attorney, Agent, or Firm—Ladas & Parry

[57] ABSTRACT

The present invention relates to a spindle motor used in a hard disc drive or a magnetic recording/reproducing apparatus, wherein air discharge guiding arrangement prevents foreign matter such as lubricating particles and dust scattered in the bearings of the spindle motor from flowing into a clean space by guiding air flows in the direction opposite to the clean space, without using any separate hermetic seal. The arrangement is characterized in that an air discharge guiding member is fitted within the internal circumferential surface of the internal barrel or fitted onto the fixed shaft of the motor be interposed between the upper bearing and the lower bearing and is provided with spiral grooves are on the internal or external circumferential surface of the air discharge guiding member, and in that a horizontal bore is formed through the longitudinal intermediate portion of the shaft and a vertical bore is formed to be extended longitudinally from the lower end of the fixed shaft to the horizontal bore and to be communicated with the horizontal bore, whereby air flows generated by the spiral grooves can be discharged to the outside through the horizontal bore and vertical bore.

4 Claims, 3 Drawing Sheets

AIR DISCHARGE GUIDING ARRANGEMENT FOR PREVENTING THE SCATTERING OF FOREIGN MATTER OF A SPINDLE MOTOR

BACKGROUND OF THE INVENTION

1. Field of the Invention

The present invention relates to an air discharge guiding arrangement incorporated within a spindle motor used in a hard disc drive (HDD) or a magnetic recording/reproducing system for preventing foreign matter such as bearing lubricating oil particles and dust from scattering and flowing into a clean region of the hard disc.

2. Description of the Prior Art

In general, spindle motors used in hard disc drives (HDD) or magnetic recording/reproducing systems include bearings b respectively mounted on upper and lower portions of a fixed shaft as shown in FIG. 1 and these bearings typically contain lubricating oil (e.g., grease oil). If these bearings b containing lubricating oil rotate at a high speed, lubricating oil will be scattered in fine particle or liquid droplet states, and if the particles or droplets are spread and deposited onto a disc d which should be maintained within a clean space c, they will cause errors in reading and writing the disc and further significantly reduce the life span of the disc.

Therefore, sealing devices surrounding the upper and lower bearings b have been used to prevent scattering lubricating oil particles from flowing into the clean space c, and mainly Labyrinth seals s1 as shown in FIG. 1 or liquid magnetic fluid seals s2 as shown in FIG. 2 are used for those sealing devices.

Although Labyrinth seals s1 and liquid magnet seals s2 have beneficial effects in maintaining a gas-tight environment they have problems in that liquid magnet may be scattered when they rotate above a predetermined speed, their costs are very high, and the productivity in assembling them is very poor since many assembling steps are involved due to individually separated parts thereof.

SUMMARY OF THE INVENTION

The present invention has been conceived to solve the problems of the prior art as explained in the above, and the principal object of the present invention is to prevent foreign matter from flowing into a clean space by guiding surrounding air flow into a direction opposite the clean space through simple addition of several parts to the shaft section of a spindle motor and some constructional modification thereof, without using any separate hermetic seal.

According to one aspect for accomplishing the above object, the present invention provides air discharge guiding arrangement for preventing the scattering of foreign matter in a spindle motor wherein the spindle motor comprises a fixed shaft vertically fitted through the center portion of a housing assembly, a pair of upper and lower bearings respectively mounted on the upper and lower ends of the fixed shaft, and having an internal barrel and receiving the upper and lower bearings within the upper and lower portions of the internal barrel, so that the hub is rotatable via the upper and lower bearings the arrangement being characterized in that an air discharge guiding member having internal and external circumferential surfaces is fitted within the internal circumferential surface of the internal barrel to be interposed between the upper bearing and the lower bearing and is provided with spiral grooves on the internal circumferential surface thereof, the internal circumferential surface of the air discharge guiding member being located close to the external circumferential surface of the fixed shaft, and in that a horizontal bore is formed transversely through a longitudinal intermediate portion of the shaft and a vertical bore is formed to be extended longitudinally from the lower end of the fixed shaft to the horizontal bore and to be communicated with the horizontal bore, whereby air flows generated by the spiral grooves will be discharged to the outside through the horizontal bore and the vertical bore.

According to another aspect, the present invention provides an air discharge guiding arrangement of another construction characterized in that an air discharge guiding member having internal and external circumferential surfaces is interference-fitted onto the fixed shaft to be interposed between the upper bearing and the lower bearing and is provided with the spiral grooves on the external circumferential surface thereof, the external circumferential surface being located close to the internal circumferential surface of the internal barrel of the hub, a horizontal bore is formed transversely through a longitudinal intermediate portion of the shaft and through the guiding member, and a vertical bore is formed to extend longitudinally from the lower end of the fixed shaft to the center portion of the horizontal bore and to be communicated with the horizontal bore, whereby air flows generated by the spiral grooves will be discharged to the outside through the horizontal and vertical bores.

DESCRIPTION OF THE PREFERRED EMBODIMENTS

Figure 1:
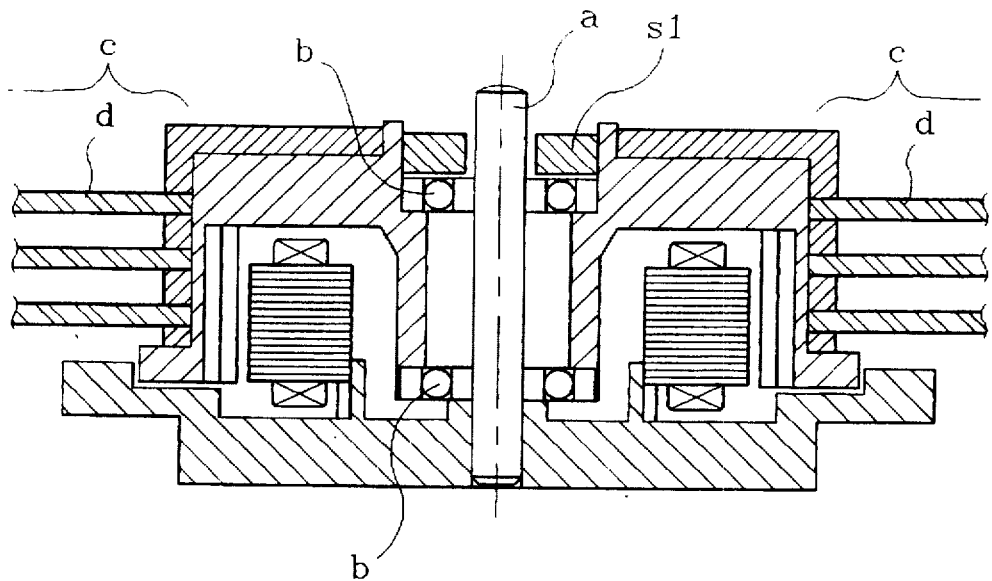
FIG. 1 is a cross-sectional view illustrating an arrangement of the prior art for preventing the scattering of foreign matter.
Figure 2:
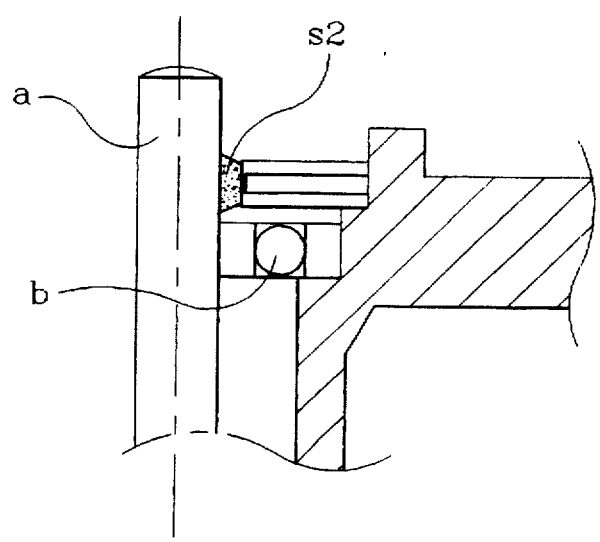
FIG. 2 is a partial cross-sectional view illustrating another arrangement of the prior art.
Figure 3:
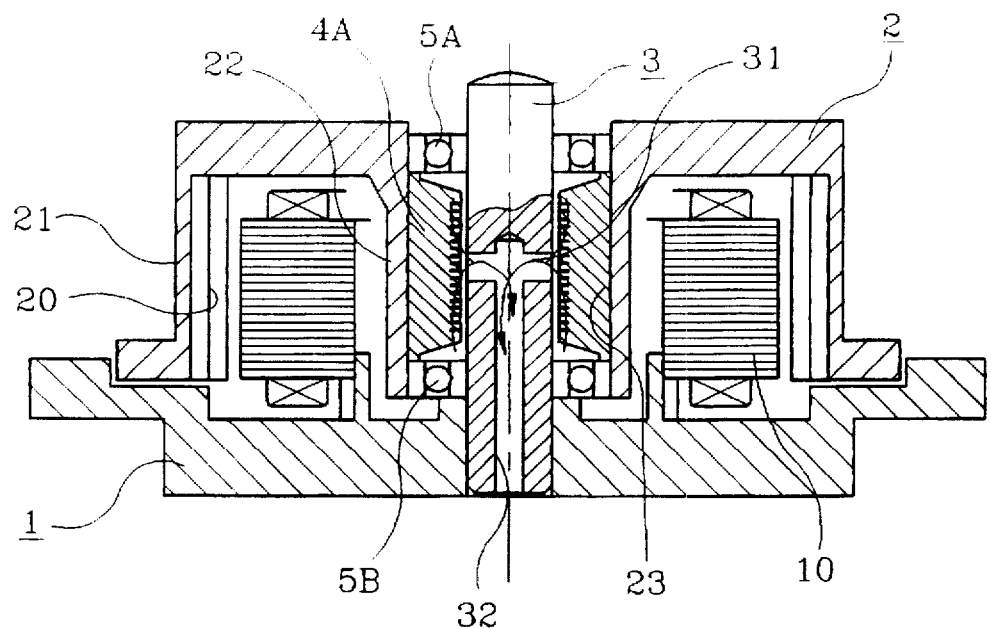
FIG. 3 is a cross-sectional view illustrating a preferred embodiment of the present invention.
Figure 4:
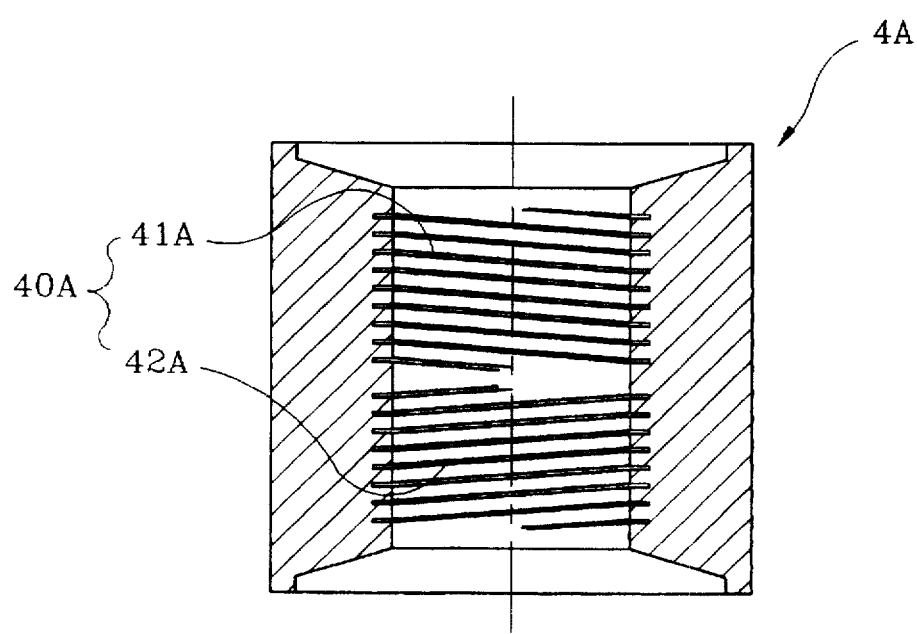
FIG. 4 is a cross-sectional view illustrating the main part shown in FIG. 3 on an enlarged scale.

FIG. 3 is a cross-sectional view illustrating a preferred embodiment of the present invention and FIG. 4 is a cross-sectional view illustrating the main part, i.e., an air discharge guiding member shown in FIG. 3, on an enlarged scale.

As shown in the above drawings, a spindle motor comprises a housing assembly 1 having a stator 10 and a fixed shaft 3 vertically inserted through a center portion of the assembly, and a hub 2 having an external barrel 21 containing a rotator magnet 20 fitted within the internal circumferential surface thereof and an internal barrel 22 containing a pair of bearings 5A and 5B at the upper and lower parts thereof, the bearings 5A and 5B being axially installed on the fixed shaft 3 of the housing assembly 1, so that the hub can be rotated via the bearings.

Up to this point, the description of the spindle motor conforms to known designs in the prior art. The differences between the present invention as compared with the known arrangement are that an air discharge guiding member 4A is fitted within the internal circumferential surface of the internal barrel 22 of the hub 2 to be interposed between the upper and lower bearings 5A and 5B, and that horizontal and vertical air discharge bores 31 and 32 are formed in the fixed shaft 3. The air discharge guiding member 4A is inference-fitted within the internal barrel 22 of the hub 2, the internal diameter of the air discharge guiding member being somewhat greater than the diameter of the fixed shaft 3 so that the internal surface of the guiding member is located close to the external circumferential surface of the fixed shaft, and the spiral grooves are formed on the internal circumferential surface of the air discharge guiding member. Taking the rotating direction of the spindle motor into consideration, the spiral grooves 40A consist of downwardly directed grooves 41A of the upper half part formed in a right-hand screw thread form and upwardly directed grooves 41B of the lower half part formed in a left-hand screw thread form. Here, the direction of the screw threads may be changed in accordance with the rotating direction of the motor. Furthermore, the horizontal bore 31 is formed transversely through the fixed shaft 3 at a longitudinal intermediate portion thereof (corresponding to the height where the downwardly directed grooves 41A and the upwardly directed grooves 41B meet each other) and the vertical bore 32 extends along the central axis of the fixed shaft 3 from the lower end of the fixed shaft to the horizontal bore 31 and in communication with the horizontal bore.

In operation of the present invention constructed as explained above, the air discharge guiding member 4A fitted within the internal barrel 22 of the hub 2 will be rotated as the rotor of the spindle motor is rotated, and air flows will be generated by the spiral grooves 40A formed on the internal circumferential surface of the air discharge guiding member as the air discharge guiding member 4A is rotated.

Specifically, as the air discharge guiding member 4A is rotated, the downwardly directed grooves 41A of the upper half part of the air discharge guiding member will guide air flows downwardly, while the upwardly directed grooves 42A of the lower half part will guide air flows upwardly, and thus the air flows will join at the longitudinal intermediate portion of the air discharge guiding member 4A, then will flow through the horizontal bore 31 formed in the fixed shaft, and finally will be discharged to the outside through the vertical bore 32 which is formed to be opened at the end of the fixed shaft.

Therefore, scattering foreign matter such as lubricating oil particles and dust will not be diffused into the clean space(s), because the air discharge guiding member 4A guides air remaining adjacent bearings to flow in a direction away from the clean space(s) as soon as the spindle motor operates.

Figure 5:
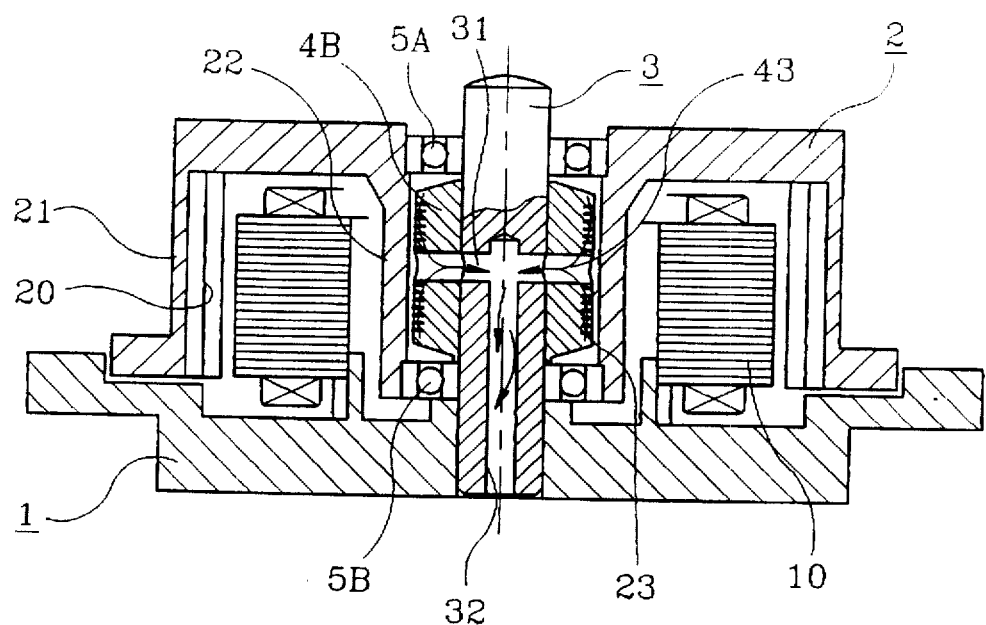
FIG. 5 is a cross-sectional view illustrating another preferred embodiment of the present invention.
Figure 6:
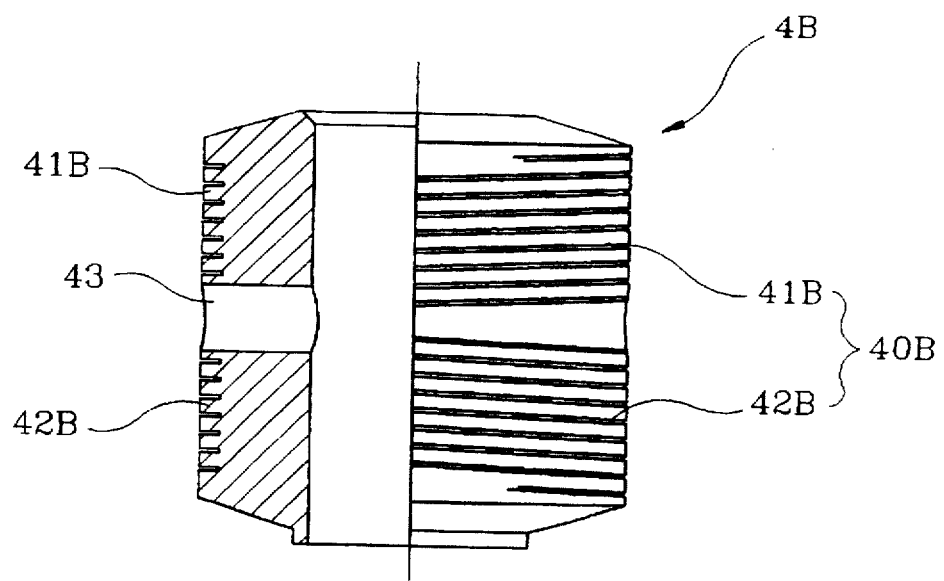
FIG. 6 is a cross-sectional view illustrating the main part shown in FIG. 5 on an enlarged scale.

FIG. 5 is a cross-sectional view illustrating another preferred embodiment of the present invention and FIG. 6 is a cross-sectional view illustrating the main part, i.e., the air discharge guiding member shown in FIG. 5, on an enlarged scale.

The spindle motor shown in FIG. 5 is similar to the afore-mentioned embodiment in basic construction, except that the air discharge guiding member 4B is fitted onto a longitudinal intermediate portion of the fixed shaft 3, i.e., between the upper bearing 5A and the lower bearing 5B, rather than being fitted within the internal barrel 22 of hub 2, and the spiral grooves 40B are formed on the external circumferential surface of the air discharge guiding member 4B.

In this embodiment, the air discharge guiding member 4B also has an external circumferential surface, the diameter of which is close to but somewhat smaller than that of the internal circumferential surface 23 of the internal barrel 22 of the hub 2, and the spiral grooves 40B also consist of downwardly directed grooves 41B of the upper half part and upwardly directed grooves 42B of the lower half part. Furthermore, the horizontal bore 31 extends through the fixed shaft 3 to connect with lateral transverse bores 43 formed through the cylindrical wall of the air discharge guiding member 4B, and the vertical bore 32 extends along the central axis of the fixed shaft to communicate with the center portion of the horizontal bore 31. This is similar to the afore-mentioned embodiment.

In this embodiment, although the air discharge guiding member 4B fitted onto the fixed shaft does not rotate when the rotor initiates rotation, air flows generated between the external circumferential surface of the air discharge guiding member 4B and the internal circumferential surface 23 of the hub 2 are forced to be moved along the spiral grooves 40B.

Specifically, in the external circumferential surface of the air discharge guiding member 4B, the downwardly directed grooves 41B of the upper half part will guide air flows downwardly, while the upwardly directed grooves 42B of the lower half part will guide air flows upwardly, and thus the air flows will join at the longitudinal intermediate portion of the air discharge guiding member 4B, then will sequentially flow through the lateral transverse bores 43 and the horizontal bore 31 formed in the air discharge guiding member 4B and the fixed shaft 3, respectively, and finally will be discharged to the outside through the vertical bore 32 which communicates with the horizontal bore 31 and is downwardly open.

Therefore, scattering foreign matter such as lubricating oil particles and dust can not be diffused into the clean space, because the air discharge guiding member 4B will guide air remaining adjacent the bearings to flow in a direction away from the clean space(s) as soon as the spindle motor operates.

As explained above, according to the present invention, foreign matter such as bearing lubricating oil particles and dust, which may be scattered during the rotation of a spindle motor will be prevented from flowing into the clean space(s) without using any separate hermetic seal in the bearing regions, since the spiral grooves formed on the air discharge guiding member mounted in the fixed shaft section will guide air flows in the direction away from the clean space for discharge to the outside through the horizontal and vertical bores formed in the fixed shaft of the spindle motor. Therefore, errors in recording/reproducing a disc can be significantly reduced and the life span of the disc can be extended.

What is claimed is:

1. Air discharge guiding arrangement for preventing the scattering of foreign matter in a spindle motor, wherein the spindle motor comprises a fixed shaft vertically fitted through a center portion of a housing assembly, a pair of upper and lower bearings respectively mounted on upper and lower ends of the fixed shaft, and a hub having an internal barrel and receiving the bearings within upper and lower portions of the internal barrel, so that the hub is rotatable via the upper and lower bearings, the hub having an external barrel for supporting a disc medium for rotation within a clean space, said guiding arrangement comprising an air discharge guiding member having internal and external circumferential surfaces fitted within the internal circumferential surface of the internal barrel between the upper and lower bearings, said air discharge guiding member being provided with spiral grooves on the internal circumferential surface thereof, the internal circumferential surface being located close to the outer circumferential surface of the fixed shaft, a horizontal bore being formed transversely through a longitudinal intermediate portion of the shaft and a vertical bore being formed in said shaft and extending longitudinally from a lower end of the fixed shaft into communication with the horizontal bore, so that upon rotation of said hub air flows are self-generated by the spiral grooves and the air flows travel from between the bearings in a direction away from said space containing the disc medium for discharge to the outside through the horizontal and vertical bores.

2. The arrangement in accordance with claim 1, wherein the spiral grooves formed in the internal circumferential surface of the air discharge guiding member consist of downwardly directed grooves formed as right-hand screw threads in an upper half of the guiding member and upwardly directed grooves formed as left-hand screw threads in a lower half of the guiding member such that the downwardly directed grooves in the upper half of the air discharge guiding member will guide the air flows downwardly, while the upwardly directed grooves in the lower half of the guiding member guide the air flows upwardly, said horizontal bore being disposed between and in communication with said upwardly and downwardly directed grooves to convey said air flows to the vertical bore and then to the outside.

3. Air discharge guiding arrangement for preventing the scattering of foreign matter in a spindle motor wherein the spindle motor comprises a fixed shaft vertically fitted through a center portion of a housing assembly, a pair of upper and lower bearings respectively mounted on upper and lower ends of the fixed shaft, and a hub having an internal barrel and receiving the upper and lower bearings within upper and lower portions of the internal barrel, so that the hub is rotatable via the upper and lower bearings, the hub having an external barrel for supporting a disc medium for rotation within a clean space, said guiding arrangement comprising an air discharge guiding member having internal and external circumferential surfaces, the internal circumferential surface of the air discharge guiding member being interference-fitted onto the fixed shaft between the upper and lower bearings said air discharge guide member being provided with the spiral grooves on the external circumferential surface thereof, the external circumferential surface of the air discharge guiding member being located close to the internal circumferential surface of the internal barrel of the hub, a horizontal bore being formed transversely through a longitudinal intermediate portion of the fixed shaft to connect with lateral transverse bores formed through a wall of the air discharge guiding member, and a vertical bore being formed in said shaft and extending longitudinally from a lower end of the fixed shaft into communication with a center portion of the horizontal bore, so that upon rotation of said hub air flows are self-generated by the spiral grooves and the air flows travel from between the bearings in a direction away from said space containing the disc medium for discharge to the outside through the lateral transverse bore, the horizontal bore and, the vertical bore.

4. The arrangement in accordance with claim 3, wherein the spiral grooves formed on the external circumferential surface of the air discharge guiding member consist of downwardly directed grooves formed as right-hand screw threads in an upper half of the guiding member and upwardly directed grooves in the form of left-hand screw threads in a lower half of the guiding member so that the downwardly directed grooves in the upper half of the air discharge guiding member guide the air flows downwardly, while the upwardly directed grooves in the lower half of the air discharge guiding member guide the air flows upwardly, said horizontal and transverse bores being disposed between and in communication with said upwardly and downwardly directed grooves to convey said air flows to the vertical bore and then to the outside.

* * * * *